US008060293B2

(12) United States Patent
Meyer et al.

(10) Patent No.: US 8,060,293 B2
(45) Date of Patent: Nov. 15, 2011

(54) SYSTEM AND METHOD FOR CONTROLLING AN ENGINE DURING TRANSIENT EVENTS

(75) Inventors: Daniel Lawrence Meyer, Dearborn, MI (US); Christopher Paul Glugla, Macomb, MI (US); Mrdjan J. Jankovic, Birmingham, MI (US); Davorin D. Hrovat, Ann Arbor, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 282 days.

(21) Appl. No.: 12/485,515

(22) Filed: Jun. 16, 2009

(65) Prior Publication Data

US 2010/0318279 A1 Dec. 16, 2010

(51) Int. Cl.
*G06F 19/00* (2011.01)
*F02D 41/14* (2006.01)

(52) U.S. Cl. ........ 701/104; 701/103; 701/109; 701/115; 123/435; 123/674

(58) Field of Classification Search .................. 123/478, 123/480, 486, 492, 493, 674, 675, 687, 435, 123/436; 701/101–105, 110, 115, 109
See application file for complete search history.

(56) References Cited

U.S. PATENT DOCUMENTS

| | | | | |
|---|---|---|---|---|
| 4,271,811 | A | 6/1981 | Suzuki et al. | |
| 6,006,727 | A | 12/1999 | Katashiba et al. | |
| 7,104,043 | B2 | 9/2006 | Zhu et al. | |
| 7,111,593 | B2 * | 9/2006 | Song et al. | 123/674 |
| 7,216,640 | B2 * | 5/2007 | Song et al. | 123/698 |
| 7,369,934 | B2 * | 5/2008 | Chatfield et al. | 701/104 |
| 7,475,671 | B1 * | 1/2009 | Fattic et al. | 701/105 |
| 2007/0079817 | A1 | 4/2007 | VanDyne et al. | |

* cited by examiner

*Primary Examiner* — Willis Wolfe, Jr.
(74) *Attorney, Agent, or Firm* — Julia Voutyras; Brooks Kushman P.C.

(57) ABSTRACT

Systems and methods for controlling an internal combustion engine include adjusting fuel delivered to a cylinder during a transient event by an amount indexed by number of combustion events after detecting the transient event. A base fueling parameter may be adjusted by an adaptive correction value indexed by combustion events after the transient event is detected, with the adaptive value determined using air/fuel ratio difference of previous combustion events during similar transient operating conditions associated with the same combustion event index number. Ionization sensor signal characteristics may be used to determine actual air/fuel ratios used to determine the air/fuel ratio difference and corresponding adaptive correction values. The adaptive values may be modified in response to a vehicle refueling event based on an amount of added fuel relative to existing fuel in the vehicle fuel tank.

19 Claims, 4 Drawing Sheets

SYSTEM AND METHOD FOR CONTROLLING AN ENGINE DURING TRANSIENT EVENTS

BACKGROUND

1. Field

Embodiments of the present disclosure relate to control of an internal combustion engine during transient events using ionization sensing.

2. Background

Transient events may occur in response to a change in driver demand, such as an increase or decrease in accelerator pedal position, and/or in response to changing engine or ambient conditions, such as during engine warm-up, for example. In port-injected engine applications, evaporation rate of the fuel puddle in the intake port is affected by differences in intake manifold filling and intake manifold pressure during increases and decreases in accelerator pedal/throttle valve positions, often referred to as tip-ins and tip-outs, respectively. Uncompensated air/fuel control would result in leaner than desired air/fuel ratios during tip-ins, and richer than desired air/fuel ratios during tip-outs. As such, the engine control strategy may increase fuel delivery to the engine for a period of time based on an empirically determined time constant established during engine development for the period of increased torque demand during a tip-in. Similarly, another empirically determined time constant may be applied by the engine control strategy to decrease fuel delivery for a period of time during decreased torque demand during a tip-out. This transient fuel compensation strategy is often performed in open loop fashion and relies on significant development resources related to data collection at various operating conditions for accurate calibration.

The desired transient fuel increase/decrease may depend on a number of factors, such as fuel type, air charge temperature, engine coolant temperature, air flow, manifold pressure, engine deposits, etc. However, the number of operating variables and the number of values for each variable actually implemented in the control strategy are generally limited by the available memory for the controller and the labor-intensive development task of determining suitable values under the selected operating conditions for a wide variety of engine applications and implementations. Suitable calibrations for engine warm-up are particularly difficult to develop due to the limited period of time at the various engine coolant, engine speed, and engine load operating conditions during representative warm-up cycles. Furthermore, fuels with various distillation characteristics can result in varying evaporation rates where less of the injected fuel is available for combustion within the combustion chamber. The resulting open loop calibration strategy can not adjust for fuel properties without the addition of a costly sensor, or by inferring the properties from other sensors.

SUMMARY

Systems and methods for controlling an internal combustion engine according to embodiments of the present disclosure include adjusting fuel delivered to a cylinder during a transient event by an amount indexed by number of combustion events after detecting the transient event to provide a desired air/fuel ratio during the transient event. In one embodiment, adjusting fuel delivered to a cylinder includes adjusting a base fueling parameter associated with current operating conditions using an adaptive value indexed by the number of combustion events after the transient event is detected. The adaptive value may be determined using previous combustion events during similar transient operating conditions associated with the same combustion event index number. In one embodiment, an ionization sensor, which may be implemented by a spark plug, for example, provides a signal having characteristics indicative of actual air/fuel ratio during a combustion event. Ionization signal characteristics during the combustion event provide an indication of actual air/fuel ratio, which is compared to desired air/fuel ratio with the difference used to determine the adaptive value used for subsequent transient events. In one embodiment, adaptive values may be modified in response to a vehicle refueling event based on an amount of added fuel relative to existing fuel in the vehicle fuel tank to account for differences in fuel characteristics.

In one embodiment, a method for controlling an internal combustion engine includes detecting a transient event, processing at least one characteristic of an ionization signal associated with a combustion event, and determining an air/fuel ratio associated with the combustion event using the at least one characteristic of the ionization signal. The method may also include storing a fueling correction value indexed by a combustion event number corresponding to number of combustion events after detecting the transient event with the fueling correction value determined in response to a scheduled fueling value and a difference between the air/fuel ratio associated with the combustion event and a desired air/fuel ratio. The method may also include adjusting fuel delivered to at least one cylinder using a previously stored fueling correction value associated with a current combustion event number only after a threshold number of combustion events at similar operating conditions have been processed.

The present disclosure includes embodiments having various advantages. For example, the present disclosure provides more accurate control of air/fuel ratio during transient events while reducing development resources associated with empirical calibration. Embodiments of the present disclosure may also provide adaptive fueling to compensate for changes in fuel characteristics by detecting vehicle refueling events and adjusting the adaptive values accordingly. In addition, embodiments of the present disclosure may be used to provide more accurate air/fuel ratio control during engine warm-up when an exhaust gas oxygen (HEGO/UEGO) sensor signal may be unavailable.

The above advantage and other advantages and features will be readily apparent from the following detailed description of the preferred embodiments when taken in connection with the accompanying drawings.

BRIEF DESCRIPTION OF THE DRAWINGS

Embodiments of the present disclosure described herein are recited with particularity in the appended claims. However, other features will become more apparent, and the embodiments may be best understood by referring to the following detailed description in conjunction with the accompanying drawings, in which:

DETAILED DESCRIPTION

Figure 1:
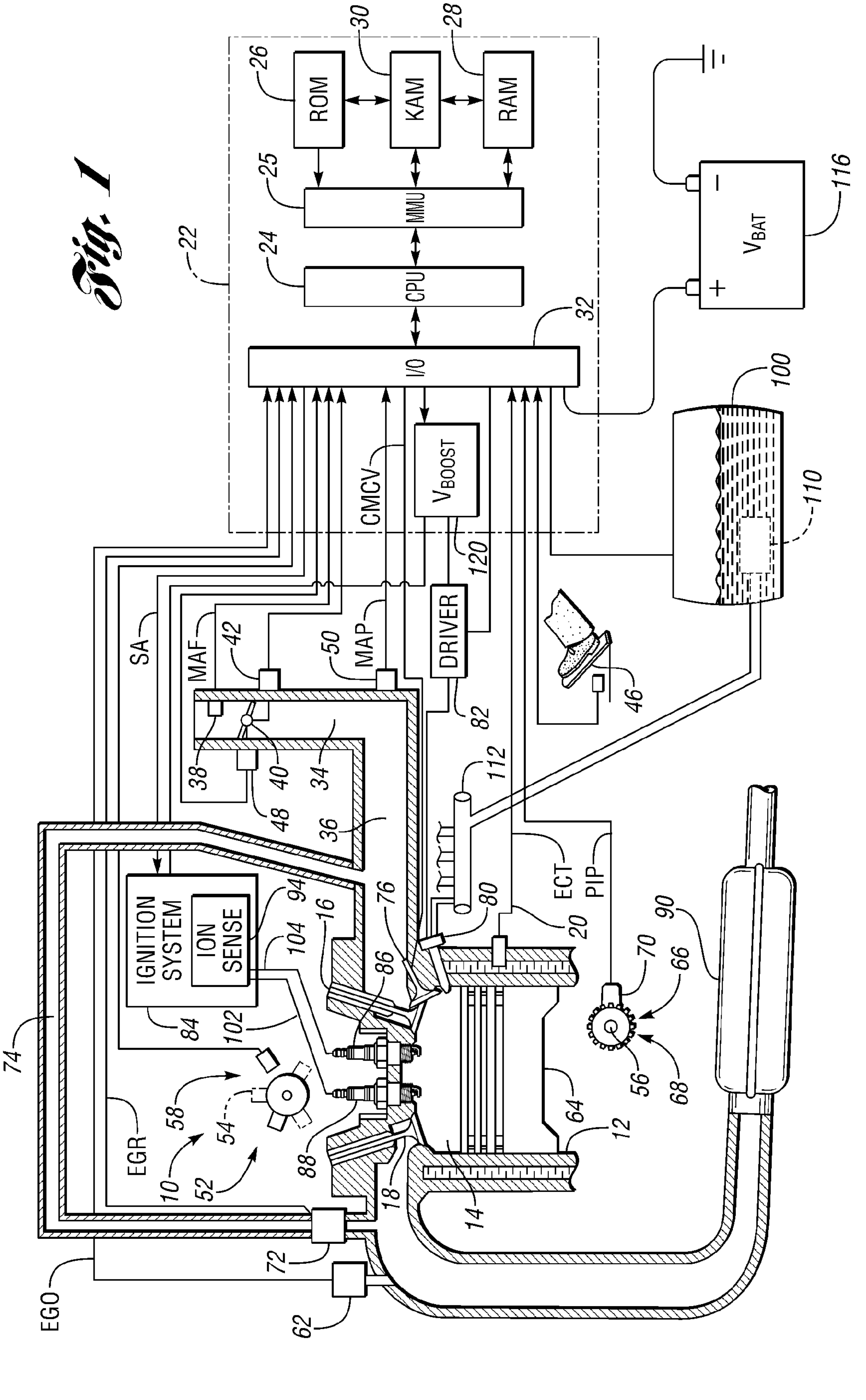
FIG. 1 is a schematic diagram illustrating one embodiment of a system or method for controlling air/fuel ratio of an internal combustion engine during a transient event according to the present disclosure.

As those of ordinary skill in the art will understand, various features of the embodiments illustrated and described with reference to any one of the Figures may be combined with features illustrated in one or more other Figures to produce embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to a multi-cylinder, internal combustion engine having at least one spark plug per cylinder that also function as an ionization sensor. However, the teachings of the present disclosure may also be used in applications having a separate ionization sensor and/or other types of combustion quality and air/fuel ratio sensors, for example. Those of ordinary skill in the art may recognize similar applications or implementations with other engine/vehicle technologies.

System 10 includes an internal combustion engine having a plurality of cylinders, represented by cylinder 12, with corresponding combustion chambers 14. As one of ordinary skill in the art will appreciate, system 10 includes various sensors and actuators to effect control of the engine. A single sensor or actuator may be provided for the engine, or one or more sensors or actuators may be provided for each cylinder 12, with a representative actuator or sensor illustrated and described. For example, each cylinder 12 may include four actuators that operate intake valves 16 and exhaust valves 18 for each cylinder in a multiple cylinder engine. However, the engine may include only a single engine coolant temperature sensor 20.

Controller 22, sometimes referred to as an engine control module (ECM), powertrain control module (PCM) or vehicle control module (VCM), has a microprocessor 24, which is part of a central processing unit (CPU), in communication with memory management unit (MMU) 25. MMU 25 controls the movement of data among various computer readable storage media and communicates data to and from CPU 24. The computer readable storage media preferably include volatile and nonvolatile storage in read-only memory (ROM) 26, random-access memory (RAM) 28, and keep-alive memory (KAM) 30, for example. KAM 30 may be used to store various operating variables, such as the fuel adjustment or correction values described herein, for example, while CPU 24 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 24 in controlling the engine or vehicle into which the engine is mounted. The computer-readable storage media may also include floppy disks, CD-ROMs, hard disks, and the like. Some controller architectures do not contain an MMU 25. If no MMU 25 is employed, CPU 24 manages data and connects directly to ROM 26, RAM 28, and KAM 30. Of course, more than one CPU 24 may be used to provide engine control and controller 22 may contain multiple ROM 26, RAM 28, and KAM 30 coupled to MMU 25 or CPU 24 depending upon the particular application. Likewise, various engine and/or vehicle control functions may be performed by an integrated controller, such as controller 22, or may be controlled in combination with, or separately by one or more dedicated purpose controllers.

In one embodiment, the computer readable storage media include stored data or code representing instructions executable by controller 22 to control a multiple cylinder internal combustion engine having at least one spark plug per cylinder. The code includes instructions that adjust fuel delivered to at least one cylinder during a transient event by an amount indexed by number of combustion events occurring after start of the transient event to provide a desired air/fuel ratio in the at least one cylinder during the transient event as described in greater detail herein. The code may also include instructions that adjust stored fueling correction values in response to a vehicle refueling event so that the correction values more accurately reflect current fuel type and/or current fuel mixture characteristics.

System 10 includes an electrical system powered at least in part by a battery 116 providing a nominal voltage, VBAT, which is typically either 12V or 24V, to power controller 22. As will be appreciated by those of ordinary skill in the art, the nominal voltage is an average design voltage with the actual steady-state and transient voltage provided by the battery varying in response to various ambient and operating conditions that may include the age, temperature, state of charge, and load on the battery, for example. Power for various engine/vehicle accessories may be supplemented by an alternator/generator during engine operation as well known in the art. A high-voltage power supply 120 may be provided in applications using direct injection and/or to provide the bias voltage for ion current sensing. Alternatively, ion sensing circuitry may be used to generate the bias voltage using the ignition coil and/or a capacitive discharge circuit as known.

In applications having a separate high-voltage power supply, power supply 120 generates a boosted nominal voltage, VBOOST, relative to the nominal battery voltage and may be in the range of 85V-100V, for example, depending upon the particular application and implementation. Power supply 120 may be used to power fuel injectors 80 and one or more ionization sensors, which may be implemented by at least one spark plug 86, 88, or by a dedicated ionization sensor. While FIG. 1 illustrates an application having two spark plugs 86, 88 per cylinder, the control systems and methods of the present disclosure are applicable to applications having only a single spark plug per cylinder, and to applications that may include one or more alternative sensors to provide an indication of combustion quality and air/fuel ratio during a transient event.

CPU 24 communicates with various sensors and actuators affecting combustion within cylinder 14 via an input/output (I/O) interface 32. Interface 32 may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to CPU 24. Examples of items that may be actuated under control of CPU 24, through I/O interface 32, are fuel injection timing, fuel injection rate, fuel injection duration, throttle valve position, spark plug ignition timing, ionization current sensing and conditioning, charge motion control, valve timing, exhaust gas recirculation, and others. Sensors communicating input through I/O interface 32 may indicate piston position, engine rotational speed, vehicle speed, coolant temperature, intake manifold pressure, accelerator pedal position, throttle valve position, air temperature, exhaust temperature, exhaust air to fuel ratio, exhaust constituent concentration, and air flow, for example.

In operation, air passes through intake 34 and is distributed to the plurality of cylinders via an intake manifold, indicated generally by reference numeral 36. System 10 preferably includes a mass airflow sensor 38 that provides a corresponding signal (MAF) to controller 22 indicative of the mass airflow. A throttle valve 40 may be used to modulate the airflow through intake 34. Throttle valve 40 is preferably electronically controlled by an appropriate actuator 42 based on a corresponding throttle position signal generated by controller 22. The throttle position signal may be generated in response to a corresponding engine output or demanded torque indicated by an operator via accelerator pedal 46. A throttle position sensor 48 provides a feedback signal (TP) to controller 22 indicative of the actual position of throttle valve 40 to implement closed loop control of throttle valve 40.

A manifold absolute pressure sensor 50 is used to provide a signal (MAP) indicative of the manifold pressure to controller 22. Air passing through intake manifold 36 enters combustion chamber 14 through appropriate control of one or more intake valves 16. Intake valves 16 and/or exhaust valves 18 may be controlled using electromagnetic valve actuators to provide variable valve timing (VVT), using a variable cam timing (VCT) device to control intake and/or exhaust valve timing, or using a conventional camshaft arrangement, indicated generally by reference numeral 52. Depending upon the particular technology employed, air/fuel ratio within a cylinder or group of cylinders may be adjusted by controlling the intake and/or exhaust valve timing to control internal and/or external EGR or to control intake airflow, for example. In some applications, mixing of inducted air and fuel may be enhanced by control of an intake manifold runner control device or charge motion control valve 76. In the embodiment illustrated in FIG. 1, camshaft arrangement 52 includes a camshaft 54 that completes one revolution per combustion or engine cycle, which requires two revolutions of crankshaft 56 for a four-stroke engine, such that camshaft 54 rotates at half the speed of crankshaft 56. Rotation of camshaft 54 (or controller 22 in a variable cam timing or camless VVT engine application) controls one or more exhaust valves 18 to exhaust the combusted air/fuel mixture through an exhaust manifold. A portion of the exhaust gas may be redirected by exhaust gas recirculation (EGR) valve 72 through an EGR circuit 74 to intake 36. Depending upon the particular application and implementation, external recirculated exhaust gas may flow through an EGR cooler (not shown) and implemented as high-pressure and/or low-pressure EGR in boosted applications. EGR valve 72 may be controlled by controller 22 to control the amount of EGR based on current operating and ambient conditions.

A sensor 58 provides a signal from which the rotational position of the camshaft can be determined. Cylinder identification sensor 58 may include a single-tooth or multi-tooth sensor wheel that rotates with camshaft 54 and whose rotation is detected by a Hall effect or variable reluctance sensor. Cylinder identification sensor 58 may be used to identify with certainty the position of a designated piston 64 within cylinder 12 for use in determining fueling, ignition timing, and/or ion sensing, for example. Additional rotational position information for controlling the engine is provided by a crankshaft position sensor 66 that includes a toothed wheel 68 and an associated sensor 70.

An exhaust gas oxygen sensor 62 provides a signal (EGO) to controller 22 indicative of whether the exhaust gasses are lean or rich of stoichiometry. Depending upon the particular application, sensor 62 may by implemented by a HEGO sensor or similar device that provides a two-state signal corresponding to a rich or lean condition. Alternatively, sensor 62 may be implemented by a UEGO sensor or other device that provides a signal proportional to the stoichiometry of the exhaust feedgas. This signal may be used to adjust the air/fuel ratio in combination with information provided by the ionization sensor(s) as described herein. In addition, the EGO signal may be used to control the operating mode of one or more cylinders, for example. As also known, EGO sensors generate operate only after reaching a minimum operating temperature, which may take anywhere from a few seconds to a few minutes depending upon the engine and ambient operating conditions. As described above, prior art transient control strategies required significant development resources to calibrate engine fueling compensation during the warm-up period or other conditions where the EGO sensor signal is unavailable. As such, the ionization signal information may be used to determine and continually update fueling correction values according to the present disclosure so that more accurate fueling adjustments may be made during transient conditions, such as during engine warm-up.

The exhaust feedgas is passed through the exhaust manifold and one or more emission control or treatment devices 90 before being exhausted to atmosphere.

A fuel delivery system includes a fuel tank 100 with a fuel pump 110 for supplying fuel to a common fuel rail 112 that supplies injectors 80 with pressurized fuel. In some direct-injection applications, a camshaft-driven high-pressure fuel pump (not shown) may be used in combination with a low-pressure fuel pump 110 to provide a desired fuel pressure within fuel rail 112. Fuel pressure may be controlled within a predetermined operating range by a corresponding signal from controller 22. Fuel tank 100 may include one or more associated sensors (not shown) for determining fuel level and/or pressure within fuel tank 100. A change in fuel level exceeding an associated threshold may be used to detect a vehicle refueling event resulting in resetting or modification of transient fueling adjustment values as described herein. Alternatively, or in combination, a change in fuel tank pressure or vacuum may be used to indicate opening of the fuel cap indicative of a refueling event. Of course, various other strategies may be used to determine a refueling event, and to optionally determine the amount of fuel added during a refueling event relative to the amount of fuel existing prior to the refueling event. The teachings of the present disclosure are independent of the particular method used to detect or determine a refueling event and/or the amount of fuel added to the tank during a refueling event.

In one embodiment, transient fueling adjustment or correction values are modified in response to detection of a vehicle refueling event. The adjustment values may be reset to a nominal value or zero, or may be modified as a function of the amount of added fuel and/or the existing fuel. For example, a linear or more complex weighting factor may be applied to reset previously stored values after a refueling event. The adjustment values may be modified based on the amount of new fuel added relative to existing fuel in tank 100 so that the adjustment values more accurately reflect characteristics associated with the current fuel mixture in tank 100.

In the representative embodiment illustrated in FIG. 1, fuel injector 80 is side-mounted on the intake side of combustion chamber 14, typically between intake valves 16, and injects fuel directly into combustion chamber 14 in response to a command signal from controller 22 processed by driver 82. Of course, the teachings of the present disclosure may also be used in applications having fuel injector 80 centrally mounted through the top or roof of cylinder 14, or with a port-injected configuration, for example. Likewise, some applications may include a combination port/direct injection arrangement. Engine control during transient events according to the present disclosure may be particularly useful in port-injected applications to better accommodate intake manifold filling effects as well as the effect of pressure dynamics on fuel puddle evaporation, which may be less significant in direct injection or combination port/direct injection applications.

Driver 82 may include various circuitry and/or electronics to selectively supply power from high-voltage power supply 120 to actuate a solenoid associated with fuel injector 80 and may be associated with an individual fuel injector 80 or multiple fuel injectors, depending on the particular application and implementation. Although illustrated and described with respect to a direct-injection application where fuel injectors often require high-voltage actuation, those of ordinary skill in the art will recognize that the teachings of the present disclosure may also be applied to applications that use port injection or combination strategies with multiple injectors per cylinder and/or multiple fuel injections per cycle as previously described.

In the embodiment of FIG. 1, fuel injector 80 injects a quantity of fuel directly into combustion chamber 14 in one or more injection events for a single engine cycle based on the current operating mode in response to a signal (fpw) generated by controller 22 and processed and powered by driver 82. As previously described, fuel injector 80 may be used as an actuator for controlling air/fuel ratio during a transient event by adjusting the pulse width of the signal applied to fuel injector 80 to modify the quantity of fuel provided to the combustion chamber to achieve a desired air/fuel ratio for a selected cylinder. The fuel pulse width may be adjusted by applying an adaptive fueling or adjustment value to a base or scheduled value corresponding to a number of combustion events after detecting initiation of a transient event. Previous transient fueling strategies utilized an empirically calibrated fuel gain and time constant associated with a decay function to reduce the added fuel as a function of time after a transient event. The adaptive transient fueling strategy of the present disclosure learns appropriate values automatically based on the number of combustion events after initiation of the transient event and the desired air/fuel ratio relative to the sensed or actual air/fuel ratio to more accurately control fueling during the transient event without empirical calibration. As such, the amount of fuel gain and the decay function are automatically embedded in the adaptive fueling values, which may also be adjusted in response to a vehicle fueling event to more accurately reflect the characteristics of the current fuel mixture.

At the appropriate time during the combustion cycle, controller 22 generates signals (SA) processed by ignition system 84 to individually control at least one spark plug 86, 88 associated with a single cylinder 12 during the power stroke of the cylinder to initiate combustion within chamber 14. Controller 22 subsequently applies a high-voltage bias across at least one spark plug 86, 88 to enable ionization signal sensing to provide combustion quality feedback. Depending upon the particular application, the high-voltage bias may be applied across the spark (air) gap or between the center electrode of spark plug 86, 88 and the wall of cylinder 12.

As previously described, controller 22 attempts to control air/fuel ratio during a transient event to achieve a desired or scheduled air/fuel ratio by adjusting the fuel pulse width based on the index number of the current combustion event relative to the beginning of the transient event. As shown in FIG. 1, ignition system 84 may include an ion sense circuit 94 associated with one or both of the spark plugs 86, 88 in one or more cylinders 12. Ion sense circuit 94 operates to selectively apply a bias voltage to at least one of spark plugs 86, 88 after spark discharge to generate a corresponding ion sense signal as shown by the representative ionization sensing signals of FIG. 2 for analysis by controller 22 to determine combustion quality and air/fuel ratio of the combustion event. The ion sense signal may be used by controller 22 for various diagnostic and combustion control purposes with the sensed air/fuel ratio determined by processing at least one characteristic of the ion sense signal, such as peak value, duration, integral, timing, etc. In one embodiment, the ion sense signal is used to provide an indication of combustion quality and actual or sensed air/fuel ratio. The actual air/fuel ratio is compared to a desired or scheduled air/fuel ratio with the difference used in combination with the base fuel scheduling parameter to determine an adaptive fuel adjustment parameter. The adaptive fuel adjustment parameter, indexed by the combustion event number, may be used during subsequent transient events to adjust the fuel delivered during a particular combustion event after the transient event begins so that the actual air/fuel ratio approaches the desired air/fuel ratio during the transient event.

Controller 22 includes code implemented by software and/or hardware to control system 10. Controller 22 generates signals to initiate coil charging and subsequent spark discharge for at least one spark plug 86, 88 and monitors the ionization sensing signal during the period after anticipated or expected spark discharge of the at least one spark plug 86, 88 as shown and described with reference to FIGS. 2-4. The ionization sensing signal may be used to provide information relative to combustion quality to manage fuel economy, emissions, and performance in addition to detecting various conditions that may include engine knock, misfire, pre-ignition, etc. Controller 22 then controls fuel delivery in response to the combustion event index to adjust fuel delivered during the transient event so the actual air/fuel ratio approaches the desired or scheduled air/fuel ratio.

Figure 2:
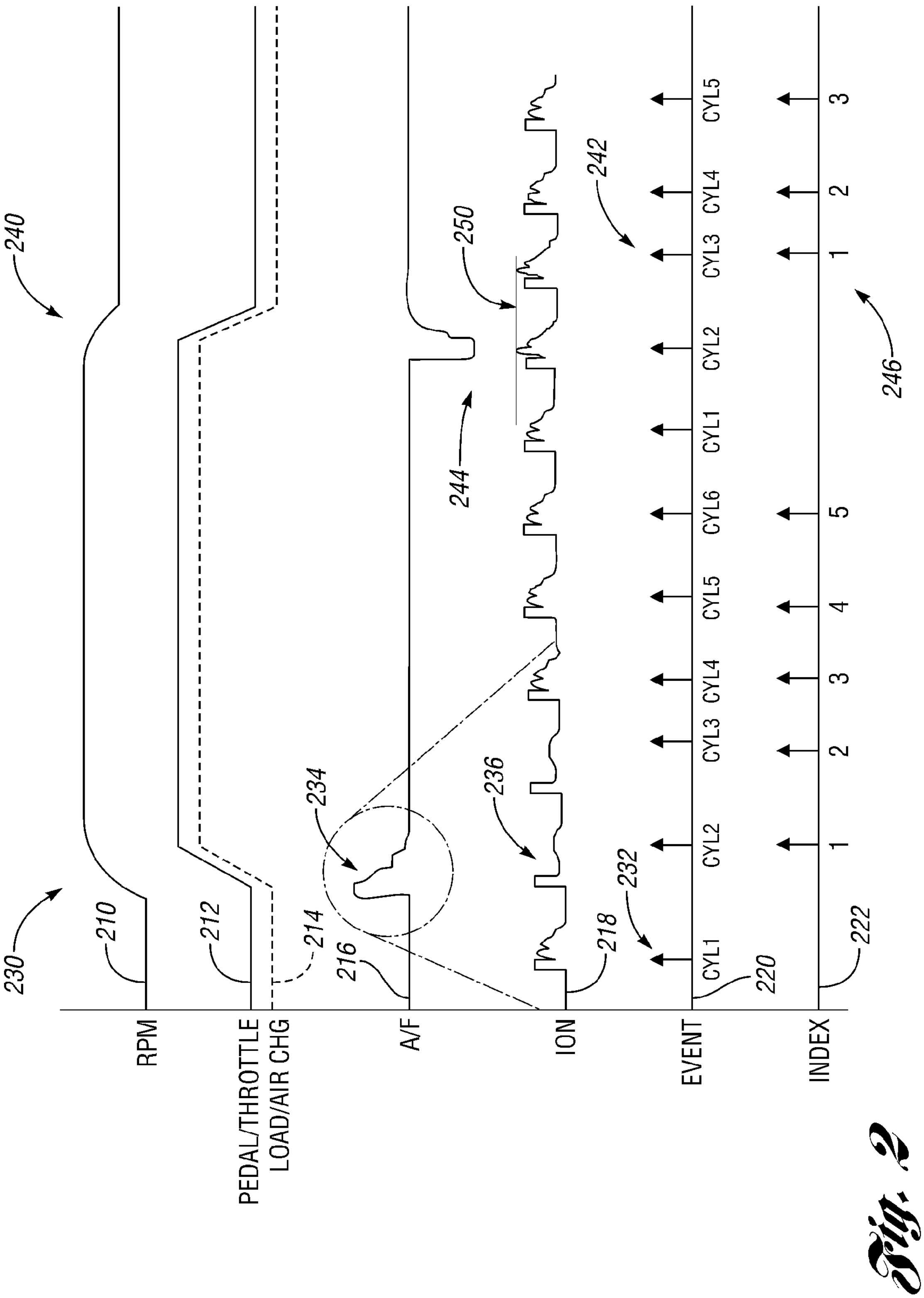
FIG. 2 illustrates representative signals and parameters for controlling an internal combustion engine during a transient event according to one embodiment of the present disclosure.

FIG. 2 illustrates signals used to control air/fuel ratio during representative acceleration and deceleration transient events for a six-cylinder internal combustion engine according to one embodiment of the present disclosure. Representative signals may be provided by an associated sensor, inferred from one or more sensors, or determined by controller 22 (FIG. 1). In the embodiment illustrated in FIG. 2, representative signals include an engine speed signal (RPM) 210, an accelerator pedal/throttle signal 212, an engine load/air charge signal 214, an air/fuel ratio (A/F) signal 216, an ion sense signal 218, a combustion event signal 220, and a combustion event index 222. Those of ordinary skill in the art will recognize that various other measured or inferred indicators may be used to detect a transient event and to control air/fuel ratio during the transient event consistent with the teachings of the present disclosure. Depending on the particular application and implementation, alternative signals/indicators or multiple signals/indicators may be used to better detect or discriminate between or among various events to improve robustness of the system. For example, a transient event may be indicated by a change in RPM signal 210, by pedal/throttle signal 212, and/or load/air charge signal 214. Some signals/indicators may have associated characteristics that are advantageous or disadvantageous for particular applications or events. For example, as shown in FIG. 2, the load/air charge signal 214 will generally lag the pedal/throttle signal 212 and the RPM signal 210 for an acceleration event 230. As such, the particular fueling compensation values and/or combustion event index may vary depending upon the particular signal(s)/indicator(s) used to detect a transient event. Different signal(s)/indicator(s) may be used to detect or indicate an acceleration event relative to the signal(s)/indicator(s) used to detect a deceleration event.

As illustrated in FIG. 2, during steady-state operation as generally represented by signals 210, 212, and 214, a first cylinder (CYL1) combustion event occurs at 232 as indicated by event signal 220. One or more signals may be used to indicate a combustion event, such as an ignition signal sent to one or more spark plugs 86, 88, a crankshaft or camshaft position signal, a cylinder pressure signal, etc. Ion signal 218 is representative of normal combustion within the corresponding cylinder (CYL1) with a stoichiometric air/fuel ratio as indicated by A/F signal 216, which is provided by an exhaust gas oxygen sensor. No transient event index signal 222 is generated during steady-state operation.

Ion sense signal 218 illustrates a representative ionization sensing signal analyzed by controller 22 (FIG. 1) to determine combustion quality (good burn, partial burn, misfire, etc.) and infer air/fuel ratio (relative to stoichiometric ratio or absolute ratio). Real-time acquired ion sense signals for each engine cylinder for each spark plug or other ionization sensor are gathered and stored by controller 22 (FIG. 1). For each combustion event, at each spark plug, the information for the most recent engine cylinder firing may be processed to identify various signal characteristics or features indicative of combustion quality and air/fuel ratio such as peak values, signal integral areas, derivative or slope values, statistics (such as maximum, minimum, mean, or variability) based on these values, or crankshaft locations (timing values) for any of the values or statistics to determine combustion quality and air/fuel ratio and/or detect various conditions such as misfire, for example. The particular feature or characteristic(s) of the ionization sensing signal used to determine combustion quality and air/fuel ratio may vary by application and implementation. The ion signals for each ignition coil in a shared cylinder are sampled at a given time or crankshaft degree intervals relative to expected ignition timing. These curve features, time-based, and/or angle-based measurements can be averaged to remove statistically random components of the ion combustion signal.

As used herein, ionization sensing signals may include the signal corresponding to an individual combustion event, or to a statistically averaged signal for a particular sensor, cylinder, cycle, etc. Generally, sufficient numbers of samples, or cylinder event series of samples, are used to ensure statistical significance for all measurements. These measurements may be collected in one group or in a one-in, one-out, sliding window form. The data elements representing one or more series of measurements may be processed to produce a regression equation once the sample size is appropriate for the desired statistical significance. These regression equations and/or transfer functions can then be used to estimate either historical or instantaneous engine combustion quality/stability and air/fuel ratio. The regression equation and or transfer function may be periodically updated for the desired level of accuracy. One skilled in the art will also recognize that other systems such as neural networks could be utilized to ascertain combustion information from the ionization sensing signals. When the engine operating time has been sufficient to allow for valid combustion stability measurements by means other that ionization sensing, these values can be used to calibrate the accuracy of the combustion stability estimate based on ionization sensing.

The regression equations, transfer functions, combustion stability estimates, and corrections based upon these estimates can all be adaptively stored for subsequent use as described herein, with resets or modifications at appropriate vehicle events, such as refueling, altitude changes, etc. FIG. 2 illustrates a representative ionization sensing signal associated with at least one spark plug or other ionization sensor during a representative combustion cycle. Ionization sensing signal 218 is analyzed during a predetermined period after the ignition or spark. Combustion quality may be determined by the level and position of one or more characteristic peaks of ionization signal 218.

An acceleration transient event is indicated by the change in values for one or more of signals 210, 212, and 214. Prior to having a threshold number of combustion events at each engine/ambient operating condition, little or no transient fuel compensation is provided and A/F signal 216 switches lean at 234 as additional air is inducted into the cylinder. A transient combustion event occurs for a second cylinder (CYL2) as indicated by signal 220, and transient combustion event index 222 is incremented. The lean A/F ratio may result in partial burn combustion resulting in a corresponding waveform for ion sense signal 218 as indicated at 236. One or more characteristics or features of ion signal 218 are analyzed or processed by controller 22 to infer a corresponding air/fuel ratio for combustion event index (1) corresponding to the first combustion event after detecting the start of a transient event. The ion signal characteristic(s) may be correlated to a sensed or actual air/fuel ratio for the combustion event, which is compared to the desired or scheduled air/fuel ratio. The difference or error between the actual and desired air/fuel ratio is then used to determine an adaptive transient fuel adjustment value, which is then stored in temporary and/or persistent memory as illustrated and described with reference to FIG. 3. After ion signals from a predetermined number of combustion events with a corresponding index and similar operating conditions have been processed, the stored adaptive transient fuel adjustment value may be applied to a base or scheduled fuel amount to reduce the difference between a desired and actual air/fuel ratio of a subsequent combustion event during a transient condition. Alternatively, a confidence or weighting factor may be determined based on the number of transient events processed, for example, and applied to the stored adjustment value so that the adjustment value is given more weight as additional combustion events are analyzed.

Ion signal 218 is processed for subsequent combustion events for a predetermined or adaptive number of combustion events after detecting the transient event 230. Although five combustion events are illustrated, typical transient events may include significantly more combustion events associated with a particular acceleration, deceleration, or operating condition transient event. For example, as previously described, transient events may also be indicated by changes in engine and/or ambient operating conditions, such as during engine warm-up, rather than by a change in accelerator pedal position or load/air charge. Operating condition transient events may be determined by monitoring sensor signals, such as engine coolant temperature (ECT), with a transient condition indicated by a change or rate of change of the signal, for example. After a selected number of combustion events have occurred, the transient event index 222 is reset awaiting detection of the beginning of a subsequent transient event. Adaptive fueling correction values may be indexed and stored separately for various types of transient events, such as acceleration, deceleration, and operating transients, for example.

A deceleration transient event is indicated generally by a change in one or more signals 210, 212, 214, as generally represented at 240 in FIG. 2. A corresponding air/fuel ratio excursion 244 as measured by an EGO sensor indicates a rich air/fuel ratio that may result in an ion signal characteristic change 250 compared to pre-transient values, for example.

Combustion event 242 corresponding to combustion within cylinder number 3 (CYL3) is indexed as the first transient combustion event after the current deceleration event is detected as represented by index 246. Ion signal 218 may then be used to determine a corresponding actual or sensed air/fuel ratio with a adaptive fueling correction value determined as described above with respect to the acceleration transient event. When a threshold number of events have been processed, the stored adaptive value may be applied to a subsequent transient event to provide a desired air/fuel ratio.

Figure 3:
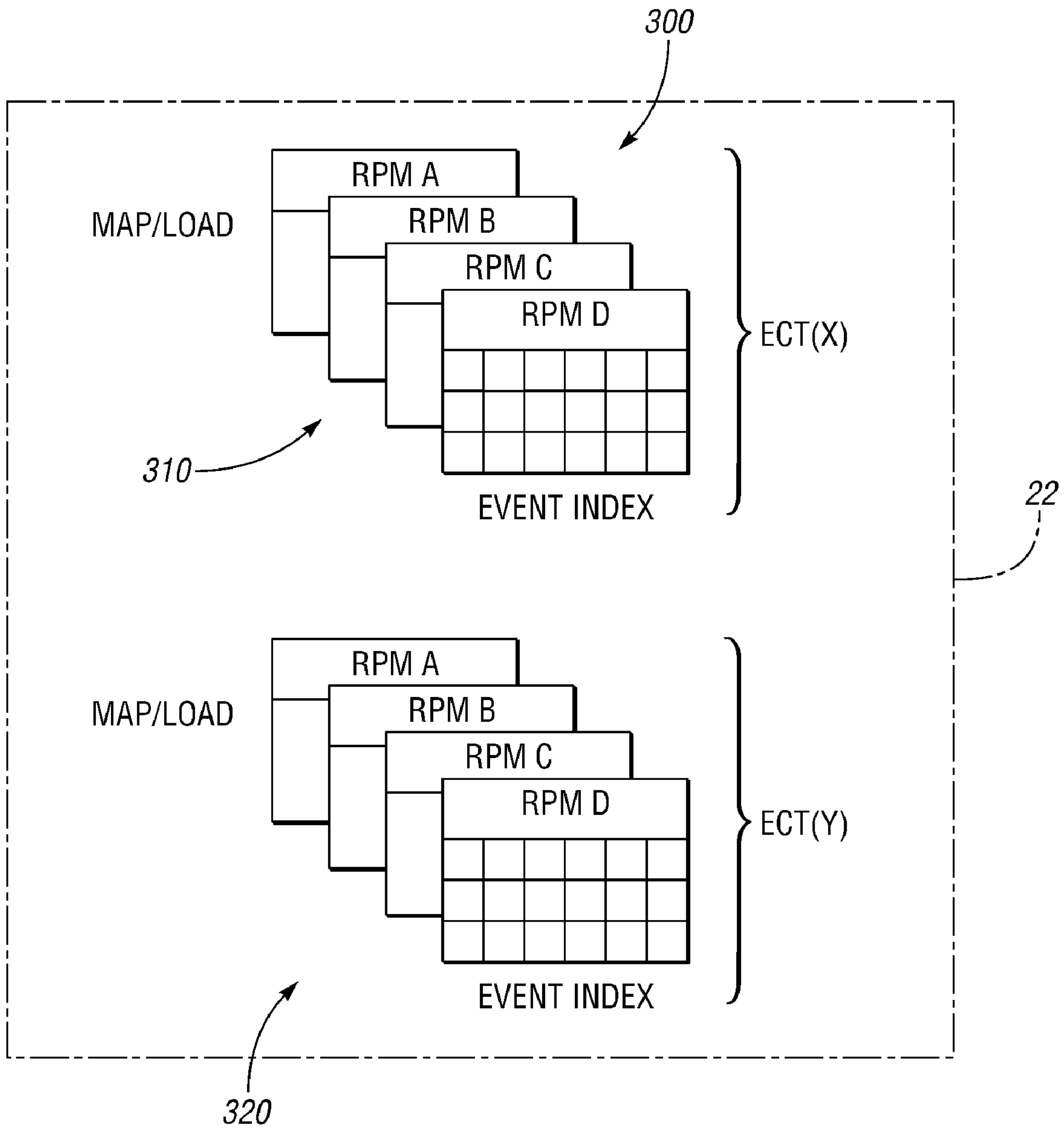
FIG. 3 illustrates one embodiment of representative tables for storing transient fueling adjustment values determined according to the present disclosure.

FIG. 3 schematically illustrates adaptive transient fuel adjustment values indexed by combustion event according to one embodiment of the present invention. Tables 300 generally represent fueling adjustment or correction values determined during engine operation and stored for subsequent use within controller 22 to control air/fuel ratio by controlling transient fueling. Those of ordinary skill in the art will recognize that multi-dimensional tables may be stored as groups of one-dimensional arrays in temporary and/or persistent memory. Stated differently, as illustrated in FIG. 3, multi-dimensional tables may be stored as one or more groups of tables having a different look-up parameter. In one embodiment, separate multi-dimensional tables are provided for acceleration events and for deceleration events. Separate tables corresponding to other actuator control may also be provided. For example, due to the effect of variable cam timing, variable valve timing, and charge motion control valve operation on fuel puddling and evaporation rates, separate tables may be provided for one or more of these actuators in some applications and implementations. Alternatively, weighting or adjustment factors may be applied to stored values depending on the state of operation of a particular airflow control device. Stored fueling correction values may be accessed by MAP/load, combustion event index, ECT, and time from engine start, for example. Stored values are updated when combustion events occur under similar operating conditions and may also be adjusted, modified, or reset in response to a vehicle refueling event as described herein. Values may also be interpolated or extrapolated using stored values from one or more tables.

Figure 4:
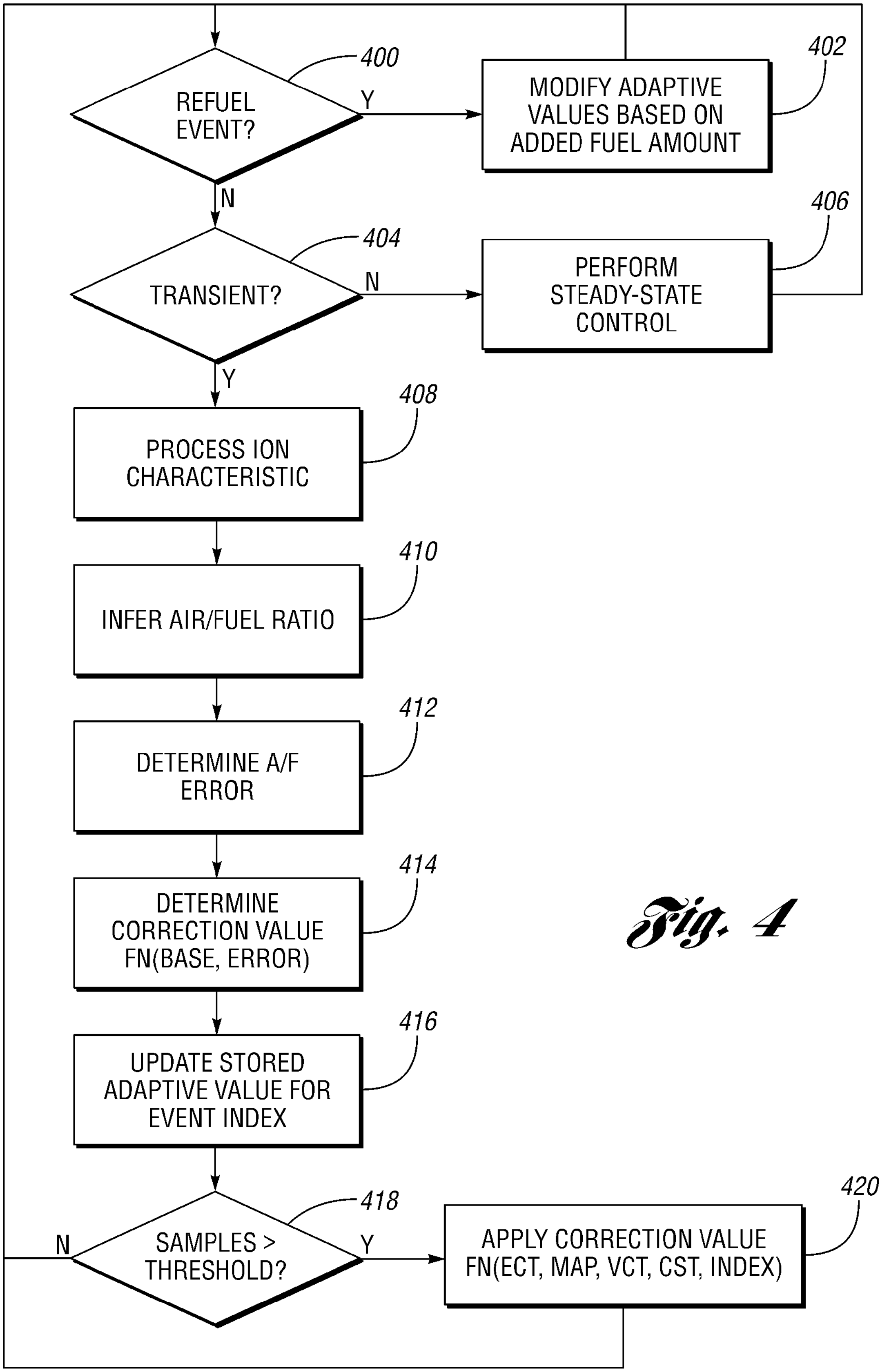
FIG. 4 is a flow chart illustrating operation of a system or method for controlling an internal combustion engine according to one embodiment of the present disclosure.

FIG. 4 is a flow chart illustrating operation of a system or method for controlling an internal combustion engine during a transient event having at least one spark plug per cylinder to adjust fuel delivered during the transient event by an amount indexed by number of combustion events occurring after start of the transient event to provide a desired air/fuel ratio during the transient event according to one embodiment of the present disclosure. As those of ordinary skill in the art will understand, the functions represented by the flow chart blocks may be performed by software and/or hardware. Depending upon the particular processing strategy, such as event-driven, interrupt-driven, etc., the various functions may be performed in an order or sequence other than illustrated in the Figures. Similarly, one or more steps or functions may be repeatedly performed, or omitted, although not explicitly illustrated. In one embodiment, the functions illustrated are primarily implemented by software, instructions, or code stored in a computer readable storage medium and executed by a microprocessor-based computer or controller, such as represented by controller 22, to control operation of the engine during a transient event.

Block 400 of FIG. 4 determines whether a vehicle refueling event has occurred. If a refueling event is detected, previously stored adaptive transient fueling correction values may be modified or adjusted as represented by block 402. In one embodiment, previously stored values are reset to zero or a nominal initial value. In another embodiment, the previously stored values are modified in response to the refueling event based on an amount of added fuel relative to existing fuel in a vehicle fuel tank. The adaptive values may be modified proportionally, or a more sophisticated weighting function may be applied so that the fueling correction values generally reflect the characteristics of the current fuel in the vehicle fuel tank.

Block 404 of FIG. 4 determines whether a transient event has been initiated by monitoring one or more signals as previously described. Block 404 may also determine the type of transient event, such as an acceleration, deceleration, or change in operating conditions (altitude, temperature, etc.). If a transient event is not indicated, steady-state fueling and air/fuel control continues as represented by block 406. When a transient operating condition is detected by block 404, a sensor determines a sensed or actual air/fuel ratio associated with each combustion event after the transient event as represented by blocks 408, and 410. In one embodiment, an ionization sensor provides a signal with at least one characteristic or feature processed as represented by block 408 to infer an actual air/fuel ratio as represented by block 410. In addition to the combustion event index, various other current operating conditions or parameters may be determined and associated with the sensed air/fuel ratio, such as ECT, MAP, time since engine start, etc. The actual air/fuel ratio is compared to a desired or scheduled air/fuel ratio to determine an air/fuel ratio difference or error as represented by block 412. An adaptive fueling correction value is then determined to provide the desired air/fuel ratio using the scheduled base fuel value and the air/fuel ratio difference as represented by block 414. The adaptive fueling correction value is then processed and stored in a memory location corresponding to the current combustion event and operating/ambient parameters associated with the event as generally illustrated and described with reference to FIG. 3. The correction value may be processed by computing a rolling average, or using another weighted function to incorporate the current value into a historical value and update the historical value, for example.

As also illustrated in FIG. 4, a previously stored transient fueling correction value may be applied to adjust the base fueling value as represented by block 420 after a threshold number of transient events have been processed as represented by block 418. The threshold number of transient events may vary depending upon the particular ambient and/or operating conditions. For example, light load operation may require more processed events than medium load operation because the ion sense signal characteristics exhibit more variability under light load engine operating conditions.

As illustrated and described with reference to FIGS. 1-4, the present disclosure includes embodiments having various advantages. For example, the present disclosure provides more accurate control of air/fuel ratio during transient events while reducing development resources associated with empirical calibration. Embodiments of the present disclosure may also provide adaptive fueling to compensate for changes in fuel characteristics by detecting vehicle refueling events and adjusting the adaptive values accordingly. In addition, embodiments of the present disclosure may be used to provide more accurate air/fuel ratio control during engine warm-up when an exhaust gas oxygen (HEGO/UEGO) sensor signal may be unavailable.

While one or more embodiments have been illustrated and described, it is not intended that these embodiments illustrate and describe all possible embodiments within the scope of the claims. Rather, the words used in the specification are words of description rather than limitation, and various changes may be made without departing from the spirit and scope of the disclosure. While various embodiments may have been described as providing advantages or being preferred over other embodiments or prior art implementations with respect to one or more desired characteristics, as one skilled in the art is aware, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed:

1. A system for controlling an internal combustion engine, the system comprising:

a first sensor for detecting a transient event;

a second sensor for determining an air/fuel ratio associated with a combustion event occurring after start of the transient event;

a fuel injector for delivering fuel to at least one cylinder of the engine;

a controller in communication with the first and second sensors and the fuel injector, the controller adjusting fuel delivered by the fuel injector to at least one cylinder during the transient event by an amount indexed by number of combustion events occurring after start of the transient event to provide a desired air/fuel ratio in the at least one cylinder during the transient event.

2. A method for controlling an internal combustion engine, the method comprising:

detecting a transient event;

processing at least one characteristic of an ionization signal associated with a combustion event;

determining an air/fuel ratio associated with the combustion event using the at least one characteristic of the ionization signal;

storing a fueling correction value indexed by a combustion event number corresponding to number of combustion events after detecting the transient event, the fueling correction value determined in response to a scheduled fueling value and a difference between the air/fuel ratio associated with the combustion event and a desired air/fuel ratio; and adjusting fuel delivered to at least one cylinder using a previously stored fueling correction value associated with a current combustion event number.

3. The method of claim 2 wherein adjusting fuel delivered comprises:

adjusting fuel delivered only after a threshold number of combustion events have occurred for each combustion event index number.

4. The method of claim 2 wherein the previously stored fueling correction value is determined in response to whether the transient event is an acceleration event or a deceleration event.

5. The method of claim 2 wherein the previously stored fueling correction value is selected based on at least one of engine speed, load, coolant temperature, and time elapsed from engine start.

6. The method of claim 2 further comprising:

adjusting stored fueling correction values in response to a vehicle refueling event.

7. The method of claim 6 wherein the stored fuel correction values are adjusted based on an amount of added fuel relative to an amount of existing fuel.

8. A method for controlling an internal combustion engine, comprising:

adjusting fuel delivered to at least one cylinder during a transient event by an amount indexed by number of combustion events occurring after start of the transient event to provide a desired air/fuel ratio in the at least one cylinder during the transient event, wherein the fuel is adjusted by an amount determined in response to operation of a variable cam timing device.

9. The method of claim 8 wherein adjusting the fuel delivered comprises:

modifying an adaptive fueling value in response to a vehicle refueling event.

10. The method of claim 8 further comprising:

determining a transient event in response to a change in accelerator pedal position.

11. The method of claim 8 wherein adjusting the fuel delivered comprises:

adjusting the fuel by an amount determined in response to whether the transient event is an acceleration event or a deceleration event.

12. The method of claim 8 wherein adjusting the fuel delivered comprises:

adjusting the fuel by an amount determined in response to operation of a charge motion control valve.

13. The method of claim 8 wherein adjusting fuel comprises:

adjusting a base fueling parameter associated with current operating conditions using an adaptive value indexed by the number of combustion events after start of the transient event.

14. The method of claim 13 wherein the adaptive value is determined using sensed air/fuel ratios for previous combustion events during similar transient operating conditions associated with a corresponding combustion event index number.

15. The method of claim 14 further comprising:

processing at least one characteristic of an ionization signal to determine the sensed air/fuel ratios.

16. The method of claim 15 further comprising:

adjusting the base fueling parameter only after a threshold number of data values of the at least one characteristic for the corresponding combustion event index number have been processed.

17. The method of claim 16 wherein the threshold number is based on current operating conditions.

18. The method of claim 16 further comprising:

modifying the adaptive value associated with the combustion event index number based on the determined air/fuel ratio.

19. The method of claim 18 further comprising:

modifying at least one adaptive value in response to a vehicle refueling event based on an amount of added fuel relative to existing fuel in a vehicle fuel tank.

* * * * *